United States Patent
Miura et al.

(10) Patent No.: US 8,548,706 B2
(45) Date of Patent: Oct. 1, 2013

(54) DEVICE OPERABLE TO CONTROL TURNING OF VEHICLE

(75) Inventors: Takami Miura, Okazaki (JP); Kaoru Sawase, Anjo (JP); Takao Matsui, Anjo (JP); Yuichi Ushiroda, Okazaki (JP); Naoki Takahashi, Anjo (JP); Keiji Suzuki, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 677 days.

(21) Appl. No.: 12/051,692

(22) Filed: Mar. 19, 2008

(65) Prior Publication Data

US 2009/0018742 A1 Jan. 15, 2009

(30) Foreign Application Priority Data

Jul. 9, 2007 (JP) ................ P2007-179643

(51) Int. Cl.
   *B60T 8/1755* (2006.01)
(52) U.S. Cl.
   USPC .................. 701/69; 701/41; 701/70; 701/72; 303/146
(58) Field of Classification Search
   USPC .................. 303/140, 146, 147, 148; 701/69, 701/70, 72
   See application file for complete search history.

(56) References Cited

U.S. PATENT DOCUMENTS

| 6,076,033 A | 6/2000 | Hamada et al. |
| 6,360,153 B1 * | 3/2002 | Shinmura et al. ............... 701/48 |
| 7,171,296 B2 * | 1/2007 | Kato et al. ...................... 701/70 |
| 2003/0102713 A1 | 6/2003 | Murakami |
| 2006/0091727 A1 * | 5/2006 | Motoyama .................... 303/189 |

FOREIGN PATENT DOCUMENTS

| DE | 197 33 674 A | 2/1999 |
| EP | 1 364 848 A1 | 11/2003 |
| JP | 07-101262 | 4/1995 |
| JP | 2007-131229 A | 5/2007 |
| JP | 4179392 | 9/2008 |
| WO | WO 2006/045467 A1 | 5/2006 |

\* cited by examiner

*Primary Examiner* — Khoi Tran
*Assistant Examiner* — Spencer Patton
(74) *Attorney, Agent, or Firm* — Birch, Stewart, Kolasch & Birch, LLP

(57) ABSTRACT

A device operable to control a turning of a vehicle, includes: a motion controller operable to: control a first adjuster so as to increase a drive force applied to at least one of front wheels and rear wheels situated in an inner side of the turning, and control a second adjuster so as to increase the braking force applied to at least one of the front wheels and the rear wheels situated in an outer side of the turning; and control the first adjuster so as to increase the drive force applied to at least one of the front wheels and the rear wheels situated in an outer side of the turning, and control the second adjuster so as to increase the braking force applied to at least one of the front wheels and the rear wheels situated in an inner side of the turning.

4 Claims, 11 Drawing Sheets

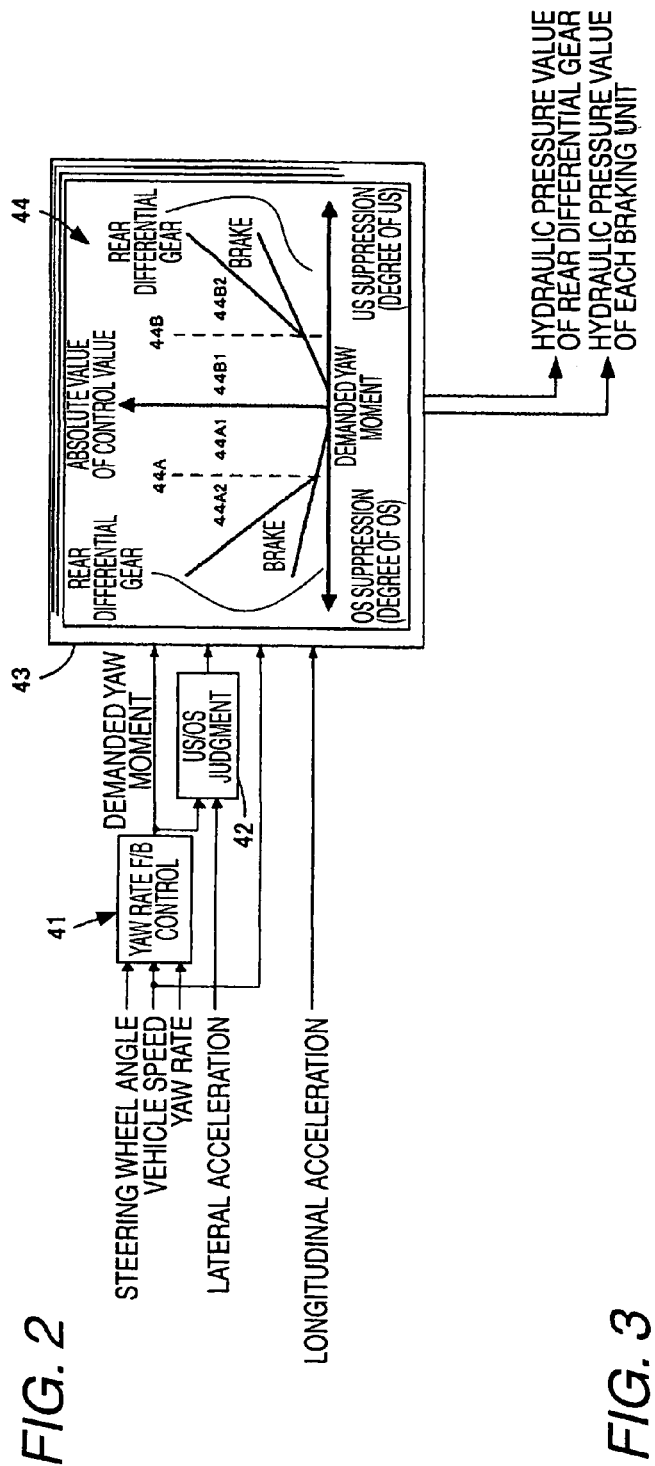

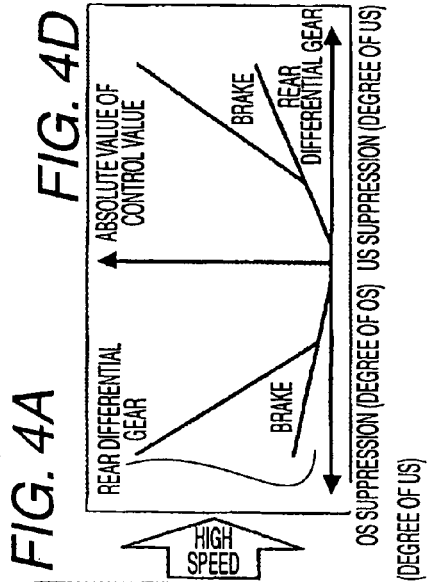
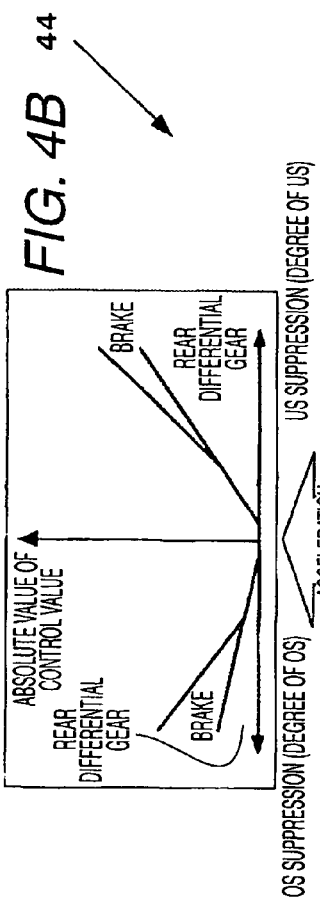
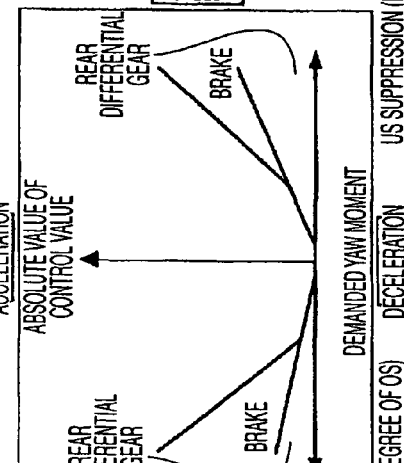
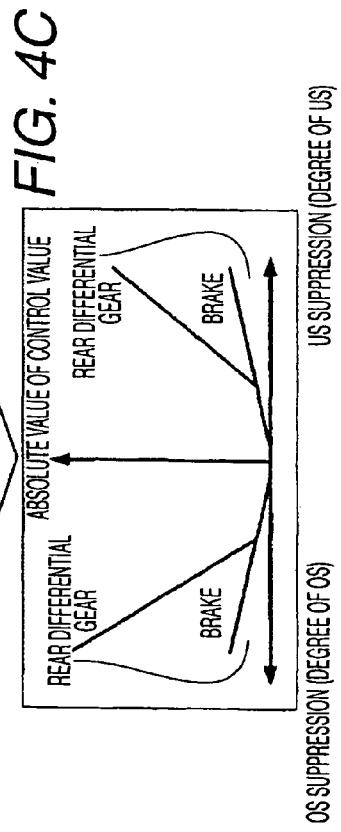
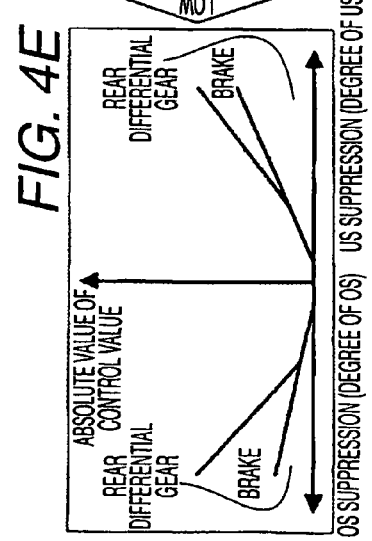

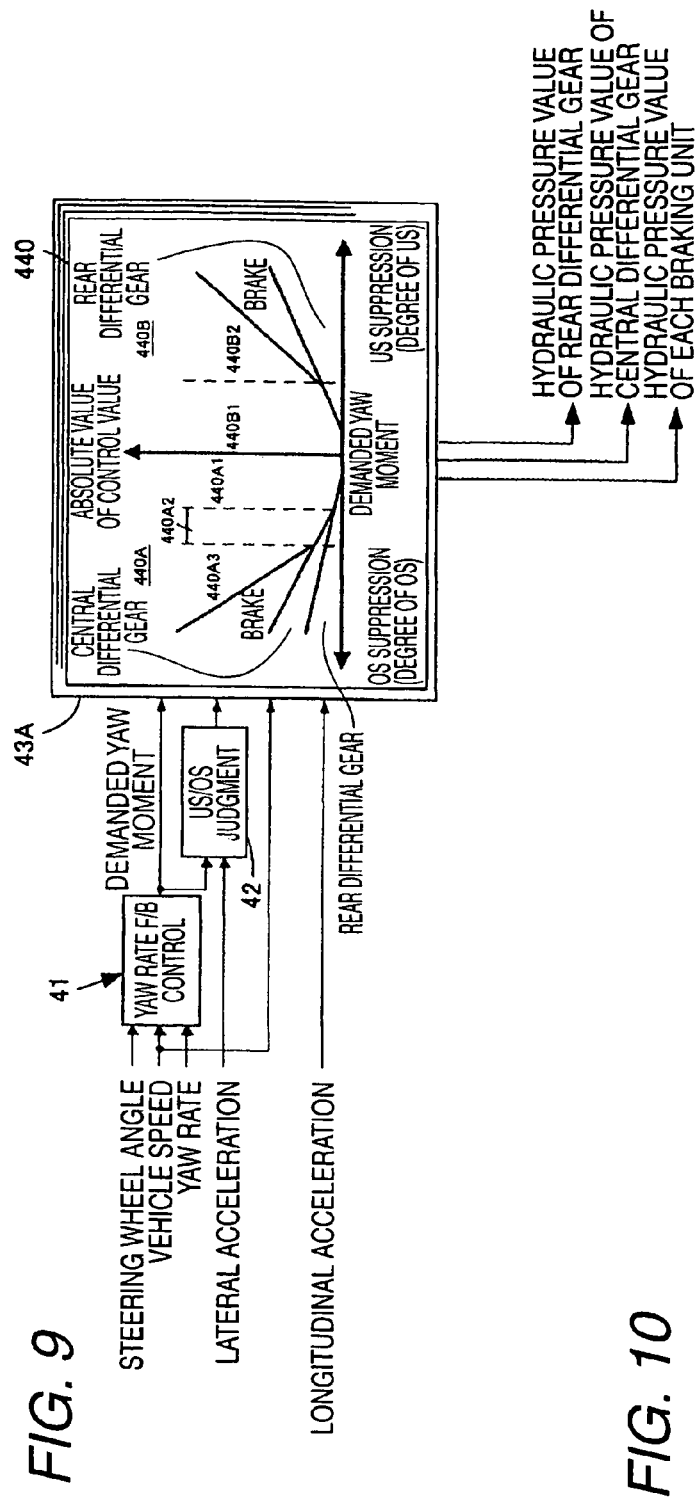

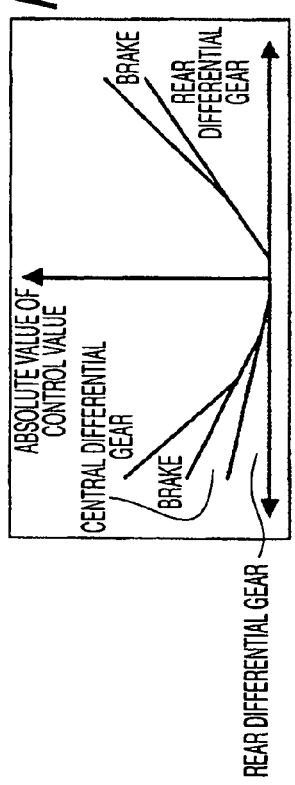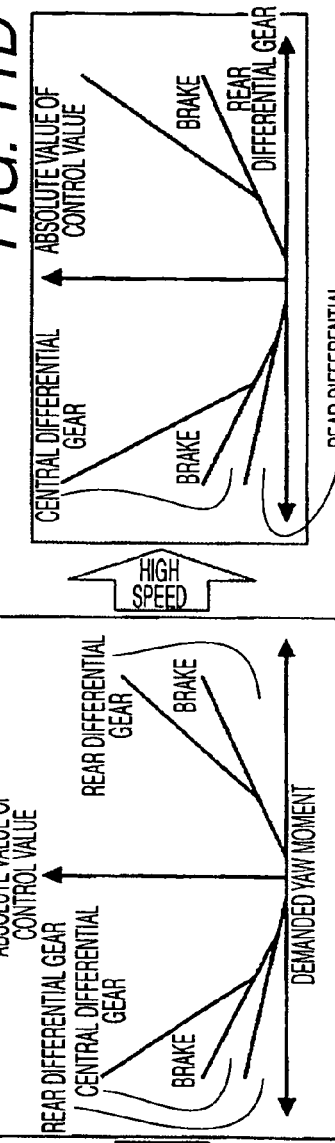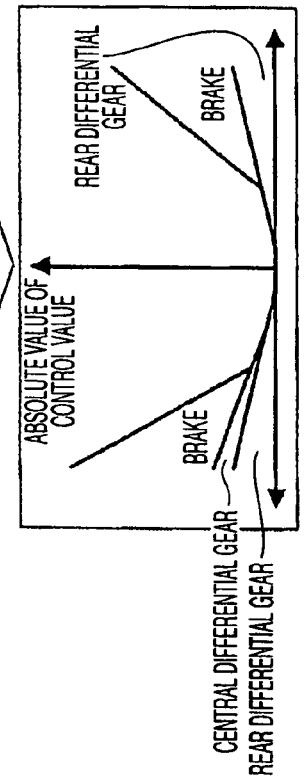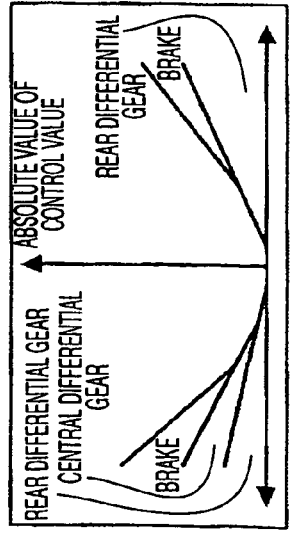

DEVICE OPERABLE TO CONTROL TURNING OF VEHICLE

BACKGROUND OF THE INVENTION

1. Field of the Invention

The present invention relates to a turning behavior control device of a vehicle.

2. Description of the Related Art

Conventionally, techniques to enhance the safety of a vehicle by stabilizing the vehicle, which is turning, have been developed. For example, Japanese Patent Publication No. 2007-131229A described later discloses a technique in which a difference of the drive force between the right and the left wheel is fed back according to a yaw rate of a vehicle and a braking force given to each wheel of the vehicle is also fed back. Further, electronic control LSD (Limited Slip Differential) of a center differential gear, in which a degree of the limitation of the differential between the front and the rear wheel is variable, is fed back according to the yaw rate of a vehicle.

However, in some cases, it is difficult to suppress a tendency of over-steering, which is caused in a turning vehicle, only by executing control so that a drive force of the inner turning wheel can be increased. That is, since a load given to the outer turning wheel is increased while the vehicle is turning and a load given to the inner turning wheel is relatively decreased, a gripping force of the inner turning wheel to grip a road surface, that is, a traction of the inner turning wheel is lowered. Therefore, even if a drive force given to the inner turning wheel is increased, the inner wheel slips and it is impossible to generate a sufficiently high moment for suppressing the tendency of over-steering in some cases. In this connection, the above-phenomenon tends to occur in the case where the turning vehicle is being accelerated.

In the case where the turning vehicle is being decelerated, not only a traction of the inner turning wheel is lowered but also a load given to the front wheel is increased and a load given to the rear wheel is relatively decreased and a traction of the rear wheel is lowered. Accordingly, even when a drive force control is executed between the right and the left wheel on the rear side, it is impossible to generate a sufficiently high moment to suppress the generation of under-steering and over-steering in some cases.

In the case where under-steering is generated when a vehicle of 4-wheel drive is turning, it is possible to adopt a method in which the tendency of under-steering is suppressed by enhancing the turning property of a vehicle by weakening the limitation of the differential between the front and the rear wheel. However, according to this method, since a traction of the entire vehicle is decreased, the accelerating performance of the vehicle is lowered. That is, on the assumption that the rear wheel of the vehicle has slipped under the condition that a differential between the front and the rear wheel made by the center differential gear is not limited, the rear wheel is further rotated. Therefore, torque originally to be transmitted to the front wheel is transmitted to the rear wheel which is slipping. Accordingly, the vehicle is limited from being accelerated.

In order to solve the above problems, the present applicant proposed the following control technique which is described in Japanese Patent Publication No. 2007-131229A. By applying the yaw rate feedback control, a limitation of the differential between the front and the rear wheel is made by the front and rear differential limitation device and a drive force control between the right and the left wheel of the vehicle is made by the right and left wheel torque difference generating device and further the brake device is integrally controlled. Only when over-steering is suppressed, in parallel with the control of the drive force between the right and the left wheel of the vehicle, controlling is executed so that a restricting force generated by the differential control between the front and the rear wheel made by the central differential gear is strengthened.

However, in the case where the yawing control is made by a braking force generated by the braking device (four wheel independence braking device) in the manner executed by the conventional constitution, a disadvantage of the feeling of speed reduction is caused. Especially when a braking force is given at the time of acceleration, control is made in the opposite direction to that of the driver's will in which the driver wants to accelerate. Therefore, the feeling of speed reduction becomes remarkable. In the case where over-steering is suppressed at the time of sudden acceleration, since the front wheel, the lateral force of which is reduced by a drive force, is braked and the lateral force is restored, over-steering is facilitated on the contrary. In the case where the vehicle is running at a low speed, deviation of the yaw rate is increased. Therefore, in the case of carrying out the suppression of under-steering and over-steering, the suppression is excessively made.

In the case where the yawing control is made by a right and left wheel torque difference generating device like the conventional constitution, since a load given to the rear wheel is decreased at the time of deceleration, a controlling capacity is lowered. Further, the suppression of over-steering made by a torque difference between the right and the left wheel on the rear side facilitates over-steering by a reduction of the lateral force of the rear wheel on the contrary.

In the case where the yawing control is executed by the front and rear differential limiting device, a vehicle, the behavior of which shows a tendency of under-steering, is put into a state of head-in/head-out depending upon the circumstances. Therefore, it is difficult to grasp a torque moving direction. Accordingly, it is difficult to suppress under-steering by the differential limitation made by the front and rear differential limiting device. Since the vehicle, the behavior of which shows a tendency of over-steering, is always put into a state of head-out, by the differential limitation made by the front and rear differential limiting device, the front wheel is given a drive force and the rear wheel is given a braking force. Therefore, when the differential limitation for suppressing over-steering is executed at the time of deceleration, the rear wheel, which is being braked, is further braked, which is a factor of facilitating over-steering.

SUMMARY OF THE INVENTION

According to one aspect of the invention, there is provided a device operable to control a turning of a vehicle, including: a first adjuster, operable to adjust a drive force applied to at least one of front wheels and rear wheels of the vehicle; a second adjuster, operable to adjust a braking force applied to at least one of the front wheels and the rear wheels; a first detector, operable to detect an acceleration and deceleration of the vehicle and a motion controller, operable to provide a control amount which is distributed to the first adjuster with a first ratio and to the second adjuster with a second ratio, the motion controller operable to: control the first adjuster so as to increase the drive force applied to the at least one of the front wheels and the rear wheels situated in an inner side of the turning, and control the second adjuster so as to increase the braking force applied to at least one of the front wheels and the rear wheels situated in an outer side of the turning, in order to suppress yawing of the vehicle; control the first adjuster so as to increase the drive force applied to at least one of the front wheels and the rear wheels situated in an outer side of the turning, and control the second adjuster so as to increase the braking force applied to at least one of the front wheels and the rear wheels situated in an inner side of the turning, in order to facilitate the yawing; increase the first ratio in a case that the first detector detects the acceleration; and increase the second ratio in a case that the first detector detects the deceleration.

BRIEF DESCRIPTION OF THE DRAWINGS

Embodiment may be described in detail with reference to the accompanying drawings, in which:

FIG. 2 is a schematic control block diagram mainly showing control made by a turning behavior control device of a vehicle of the first embodiment of the present invention;

FIG. 3 is a table showing a characteristic of strength and weakness of an amount of control of a turning behavior control device of a vehicle of the first embodiment;

FIGS. 4A to 4E are views showing an example of a control characteristic map of a turning behavior control device of a vehicle of the first embodiment;

FIG. 9 is a schematic control block diagram mainly showing control of a turning behavior control device of a vehicle of the second embodiment;

FIG. 10 is a table showing a characteristic of strength and weakness of an amount of control of a turning behavior control device of a vehicle of the second embodiment;

FIGS. 11A to 11E are views showing an example of a control characteristic map of a turning behavior control device of a vehicle of the second embodiment;

DETAILED DESCRIPTION OF THE INVENTION

Figure 1:
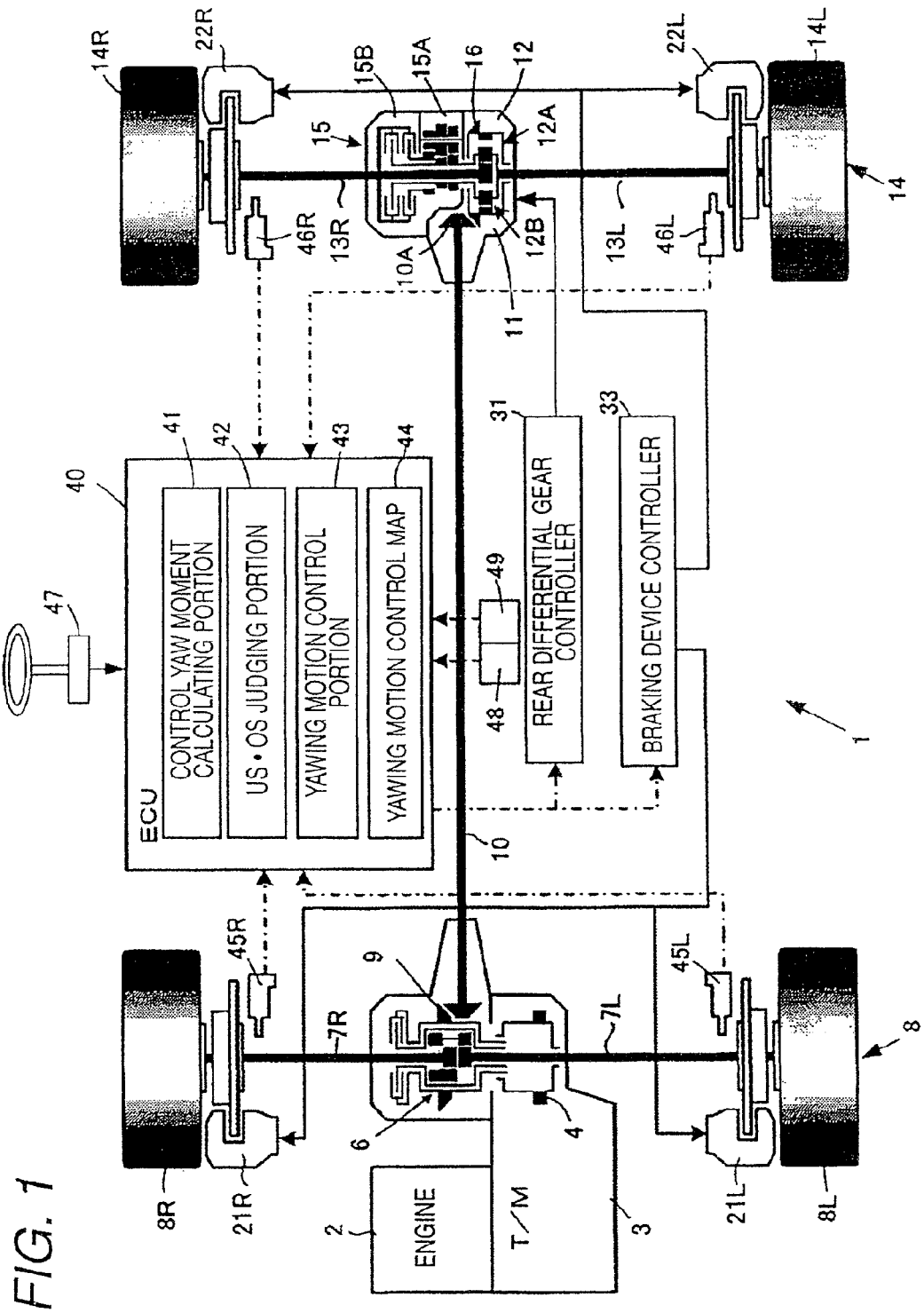
FIG. 1 is a schematic block diagram showing an overall arrangement of a turning behavior control device of a vehicle of a first embodiment of the present invention.

Referring to the drawings, a first embodiment of the present invention will be explained below. The turning behavior control device shown in FIG. 1 is applied to a four-wheel drive type vehicle 1. An output of the engine 2 mounted on the vehicle 1 is transmitted to the right front wheel 8R and the left front wheel 8L through the transmission 3, the intermediate gear mechanism 4, the front differential gear 6 and the axles 7R, 7L. At the same timer the output of the engine 2 mounted on the vehicle 1 is transmitted to the right rear wheel 14R and the left rear wheel 14L through the hypoid gear mechanism 9 on the front wheel side, the propeller shaft 10, the hypoid gear mechanism 11 on the rear wheel side, the rear differential gear 12 and the axles 13R, 13L. To be in more detail, this rear differential gear 12 includes a drive force moving mechanism 15 for moving a drive force between the right and the left wheel, the detail of which will be described later.

The front differential gear 6 is a torque induction type differential gear which mechanically restricts a differential motion made between the right 8R and the left wheel 8L according to an intensity of torque inputted from the engine 2.

Next, a drive system on the rear wheel 14 side will be explained below. In this rear wheel 14, the rear differential gear 12 is provided which allows a differential motion made between the right wheel 14R and the left wheel 14L. In this rear differential gear 12, the drive force moving mechanism 15 for moving a drive force between the right and the left wheel is provided, by which a difference of the drive force to be transmitted to the right wheel 14R and the left wheel 14R can be appropriately changed.

On the outer circumference of the case 12A of this rear differential gear 12, the crown gear 16, which is meshed with the pinion gear 10A provided at a rear end portion of the propeller shaft 10, is arranged. Inside the case 12A, the planetary gear mechanism 12B is provided. By this planetary gear mechanism 12B, a differential motion between the right wheel 14R and the left wheel 14L is allowed. Accordingly, torque, which has been inputted from the engine 2 into the crown gear 16 through the propeller shaft 10 and the pinion gear 10A, is transmitted to both wheels 14R, 14L while a differential motion between the right rear wheel 14R and the left rear wheel 14L is being allowed by the planetary gear mechanism 12B.

The drive force moving mechanism 15 for moving a drive force between the right and the left wheel includes: a change gear mechanism ISA; and a torque transmission mechanism 15B of a variable transmission capacity control type. By a command given from ECU 40 mounted on the vehicle 1, a difference between the drive force of the right wheel 14R and that of the left wheel 14L can be appropriately changed according to a running state of the vehicle. In this structure, the change gear mechanism 15A increases and decreases a rotary speed of one of the right and the left wheel (in this case, a rotary speed of the left wheel 14L) and outputs it to the torque transmission mechanism 15B.

This variable transmission capacity control type torque transmission mechanism 15B is a wet hydraulic type multiple disk clutch mechanism capable of adjusting a transmission torque capacity according to hydraulic pressure inputted from a drive system hydraulic unit controlled by ECU 40. This variable transmission capacity control type torque transmission mechanism 15B is operated as follows. By utilizing a difference between the rotary speed, which is increased or decreased by the change gear 15A, the rotary speed of the other wheel (in the present embodiment, the right wheel 14R) in the right and the left wheel, torque is given and received between the right wheel 14R and the left wheel 14L. Due to the foregoing, an intensity of torque of one wheel is increased or decreased and an intensity of torque of the other wheel is decreased or increased. In this connection, the planetary gear mechanism 12B, the change gear mechanism 15A and the torque transmission mechanism 15B described above are well known. Therefore, the detailed explanations of the structures of the above mechanisms are omitted here. Hydraulic pressure inputted from the drive system hydraulic unit into the drive force mechanism 15 for moving a drive force between the right and the left wheel is controlled by the rear differential gear controller 31. Contents of this control will be described in detail later.

Accordingly, for example, in the case where the vehicle 1 is going ahead while it is turning clockwise, a predetermined hydraulic pressure is inputted from a drive system hydraulic unit (not shown) into the drive force moving mechanism 15 for moving a drive force between the right and the left wheel of the rear differential gear 12. When the predetermined hydraulic pressure is transmitted to the right wheel 14R and the torque is decreased, the right rear wheel 14R is decelerated. At this time, torque transmitted to the left rear wheel 14L is increased and the left rear wheel 14L is accelerated. Accordingly, it is possible to generate a yaw moment, the direction of which is clockwise, in the vehicle 1.

In this connection, the above drive system hydraulic unit not shown in the drawing includes: an accumulator; a motor pump for pressurizing hydraulic oil in the accumulator at a predetermined pressure; a pressure sensor for monitoring hydraulic pressure pressurized by the motor pump; an electromagnetic control valve for adjusting hydraulic pressure in the accumulator which has already been adjusted by the motor pump; and a direction change-over valve for changing over the hydraulic pressure, which has been adjusted by the electromagnetic control valve, between a predetermined hydraulic chamber (not shown) of the drive force moving mechanism 15 for moving a drive force between the right and the left wheel and a predetermined hydraulic chamber (not shown) of the differential motion restricting mechanism for restricting a differential motion between the front 19 and the rear wheel.

The rear differential gear controller 31 (a first adjuster) is an electronic control unit having an interface, memory and CPU which are not shown in the drawing. This rear differential gear controller 31 is operated as follows. A signal (a drive force distribution signal) showing a hydraulic pressure corresponding to a drive force difference between the right rear wheel 14R and the left rear wheel 14L and also showing an output destination of the hydraulic pressure is sent to the drive system hydraulic unit. When the drive system hydraulic unit, which has received this drive force distribution signal, appropriately controls hydraulic pressure for the drive force moving mechanism 15 for moving a drive force between the right and the left wheel of the rear differential gear 12, a difference of the drive force between the right rear wheel 14R and the left rear wheel 14L is adjusted.

Wheels 8L, 8R, 14L, 14R of the vehicle 1 respectively have braking devices 21L, 21R, 22L, 22R. Control system hydraulic units for independently supplying hydraulic pressure to the braking devices 21L, 21R, 22L, 22R are provided. This vehicle 1 has a brake device controller (a second adjuster) 33, This brake device controller 33 is an electronic control unit having an interface, memory and CPU which are not shown in the drawing. This brake device controller 33 sends a signal (a brake increasing and decreasing pressure signal), which shows hydraulic pressure to be increased and decreased with respect to the four respective brake devices 21L, 21R, 22L, 22R arranged in the wheels 8L, 8R, 14L, 14R, to a control system hydraulic unit (not shown). The control system hydraulic unit, which has received this brake increase and decrease pressure signal, appropriately controls hydraulic pressure inputted into the brake device 21L, 21R, 22L, 22R. This braking system hydraulic unit includes a motor pump and an electromagnetic control valve for adjusting braking hydraulic pressure, so that a predetermined hydraulic pressure can be inputted into each braking unit 21L, 21R, 22L, 22R according to a direction given from the braking unit controller 33. As described above, the rear differential controller 31 and the braking unit controller 33 are connected to ECU 40 through signal lines and operated according to a control signal sent from ECU 40.

ECU 40 is an electronic control unit having an interface, memory and CPU which are not shown in the drawing. ECU 40 can read in the result of the detection made by the vehicle speed sensor (a second detector) 45L, 45R, 46L, 46R, the steering angle sensor 47, G sensor (a first detector) 48 and the yaw rate sensor 49.

This ECU 40 includes a control yaw moment calculation portion 41, an under-steering/over-steering judging portion (US/OS judging) 42 and a yawing motion control portion (a motion controller) 43 which are programs recorded in a memory not shown. The yawing motion control map 44 used by the yawing motion control portion 43 is recorded in this memory. The control yaw moment calculation portion 41 is provided for finding a control yaw moment which is a yaw moment to be added so that the vehicle 1 can be turned by a turning radius at which the driver intends to turn the vehicle.

As shown in FIG. 2, this control yaw moment calculation portion 41 calculates a target yaw rate (target yaw momentum correlation value) according to a steering angle, which is measured by the steering angle sensor 47, and a vehicle speed which is detected by each wheel speed sensor. Further, when this control yaw moment calculation portion 41 executes control in which a correction is made by comparing the target yaw rate with the actual yaw rate measured by the yaw rate sensor 49, that is, when this control yaw moment calculation portion 41 executes feedback control according to the actual yaw rate, the control yaw moment can be calculated.

US/OS judging portion 42 is provided for judging a turning state of the vehicle 1 that is turning. According to the control yaw moment obtained by the control yaw moment calculation portion 41 and also according to the acceleration in the lateral direction of the vehicle 1 measured by G sensor 48, it is judged whether the turning vehicle 1 is in a state (understeering state) in which under-steering (US) is being generated, the turning vehicle 1 is in a state (neutral-steering state) in which neither under-steering (US) nor over-steering (OS) is actually being generated or the turning vehicle 1 is in a state (over-steering state) in which over-steering is being generated.

When the yawing motion control portion 43 controls the rear differential controller 31 and the braking unit controller 33 according to a turning state of the vehicle 1, a yaw moment corresponding to the control yaw moment is generated in the vehicle 1. That is, when the control yaw moment obtained by the control yaw moment calculation portion 41, the result of the judgment (the turning state of the vehicle 1) made by US/OS judging portion 42 and the acceleration (longitudinal acceleration) in the longitudinal direction of the vehicle 1 detected (measured) by G sensor 48 are applied to the yawing motion control map 44, control values for controlling the rear differential gear controller 31 and the braking unit controller 33 are obtained.

In this case, the control value for the rear differential controller 31 is a value showing a degree of the drive force movement between the right wheel 14R and the left wheel 14L made by the drive force moving mechanism 15 for moving a drive force between the right and the left wheel of the rear differential gear 12. Specifically, the control value for the rear differential controller 31 is a hydraulic value of the drive force moving mechanism 15 for moving a drive force between the right and the left wheel. The control value for the braking unit controller 33 is a value showing a degree of an increase and decrease of the braking force of each braking unit 21L, 21R, 22L, 22R. Specifically, the control value for the braking unit controller 33 is a value of increasing or decreasing a hydraulic pressure of each braking unit 21L, 21R, 22L, 22R.

Next, the yawing motion control map 44 will be explained below. As shown in FIGS. 4A to 4E, the yawing motion control map 44 of the present embodiment is composed of a plurality of maps. FIG. 4A is a basic map. FIG. 4B is a map selected at the time of accelerating the vehicle. FIG. 4C is a map selected at the time of decelerating the vehicle. FIG. 4D is a map selected at the time of high speed running of the vehicle. FIG. 4E is a map selected at the time of low speed running of the vehicle. A basic arrangement of the map is explained below referring to FIG. 4A which represents the above maps. The axis of abscissas prescribes a degree of under-steering (US) generated in the vehicle 1 which is found from a turning state of the vehicle 1, that is, which is found from the control yaw moment obtained by the control yaw moment calculation portion 41 and from the result of the judgment made by US/OS judging portion 42. Alternatively, the axis of abscissas prescribes a degree of over-steering (OS). On the other hand, the axis of ordinate prescribes an absolute value of the control value for the rear differential gear controller 31 and the braking device controller 33. Besides, the high speed means a speed that is no less than a prescribed value, and the low speed means a speed that is less than the prescribed value.

As shown in FIG. 2, the yawing motion control map 44 mainly prescribes an over-steering suppression region 44A and an under-steering suppression region 44B. In this over-steering suppression region 44A, the rear differential control region 44A1 and the braking control region 44A2 are prescribed in the order of the control yaw moment, wherein the lowest control yaw moment is arranged first. In the under-steering suppression region 44B, the rear differential control region 44B1 and the braking control region 44B2 are prescribed in the order of the control yaw moment in which the lowest control yaw moment is arranged first.

In the case where the yawing motion of the vehicle 1 is suppressed, that is, in the case where over-steering (OS) generated in the vehicle 1 is suppressed, the yawing motion control portion 43 controls the rear differential gear controller 31 so that a drive force of the wheel (inner turning wheel), which is a wheel in the right wheel 14R and the left wheel 14L located on the turning center side, can be increased. In the case where over-steering (OS) generated in the vehicle 1 is suppressed and only in the case where a control yaw moment can not be still generated even when the rear differential controller 31 carries out a drive control between the right and the left wheel, the yawing motion control portion 43 controls the braking device controller 33 so that the braking force of the outer turning wheel can be stronger than the braking force of the inner turning wheel.

On the other hand, in the case where the yawing motion of the vehicle 1 is facilitated, that is, in the case where under-steering (US) generated in the vehicle 1 is suppressed, the yawing motion control portion 43 controls the rear differential gear controller 31 so that a drive force of the wheel (turning outer wheel) on the opposite side to the inner turning wheel in the right wheel 14R and the left wheel 14L can be increased. In the case where under-steering (US) generated in the vehicle 1 is suppressed and only in the case where a control yaw moment can not be still generated even when the rear differential controller 31 carries out a drive control between the right and the left wheel, the yawing motion control portion 43 controls the braking device controller 33 so that the braking force of the inner turning wheel can be stronger than the braking force of the outer turning wheel.

That is, in the case of suppressing the yawing motion of the vehicle (at the time of the generation of OS), the yawing motion control portion 43 distributes an amount of control to the rear differential gear controller 31 and the braking device controller 33 and while the rear differential gear controller 31 is being controlled so that a drive force of the inner turning wheel can be increased, the braking device controller 33 is controlled so that a braking force of the outer turning wheel can be increased. In the case of facilitating the yawing motion of the vehicle (at the time of the generation of US), the yawing motion control portion 43 distributes an amount of control to the rear differential gear controller 31 and the braking device controller 33 and while the rear differential gear controller 31 is being controlled so that a drive force of the outer turning wheel can be increased, the braking device controller 33 is controlled so that a braking force of the inner turning wheel can be increased. At the same time, in the case of facilitating the yawing motion of the vehicle (at the time of the generation of US), a ratio of the amount of control to be distributed to the rear differential controller 31 is made to be higher than the ratio of the amount of control to be distributed in the case where the yawing motion of the vehicle is suppressed (at the time of the generation of OS). In the case of suppressing the yawing motion of the vehicle (at the time of the generation of OS), a ratio of the amount of control to be distributed to the braking device controller 33 is made to be higher than the ratio of the amount of control to be distributed in the case where the yawing motion of the vehicle is facilitated (at the time of the generation of US). The yawing motion control map 44 having the above control characteristic is provided.

The basic control characteristic in the case of using the yawing motion control map 44 is described above. The yawing motion map 44 is set in detail not only for the case of under-steering (US) and over-steering (OS) but also for the case in which an absolute value of controlling is controlled being changed according to the acceleration, deceleration and speed of the vehicle and an amount of the distribution of the control between the drive force moving mechanism 15 for moving a drive force between the right and the left wheel and the braking unit is being changed as shown in FIGS. 4A to 4E. That is, a distribution of the amount of control between the rear differential controller 31 and the braking unit controller 33 can be changed according to the acceleration, deceleration and speed of the vehicle. The characteristic of the distribution of the amount of control is previously set according to the yawing motion control map 44 shown in FIGS. 4A to 4E.

In the case where the result of the detection made by G sensor 48 is an acceleration (shown in FIG. 4B), the yawing motion control map 44 makes a ratio of the amount of control distributed to the rear differential controller 31 to be higher than a ratio in the case of deceleration (shown in FIG. 4C). In the case where the result of the detection made by G sensor 48 is a deceleration (shown in FIG. 4C), the yawing motion control map 44 makes a ratio of the amount of control distributed to the braking unit controller 33 to be higher than a ratio in the case of acceleration (shown in FIG. 4B). In the case where the result of the detection made by the wheel speed sensor is a low speed (shown in FIG. 4E), a ratio of the amount of control distributed to the rear differential controller 31 is made to be higher than the ratio in the case of a high speed (shown in FIG. 4D). In the case where the result of the detection made by the wheel speed sensor is a high speed (shown in FIG. 4D), a ratio of the amount of control distributed to the braking unit controller 33 is made to be higher than the ratio in the case of a low speed (shown in FIG. 4E). The characteristic is set as described above. The characteristic of the intensity of the amount of control is shown in FIG. 3. The rear differential gear shows a rear differential controller 31 (drive force moving mechanism 15 for moving a drive force between the right and the left wheel). The brake shows a braking unit controller 33 (braking device 21L, 21R, 22L, 22R). Further, "High", "Middle" and "Low" are heights of the absolute values of the devices, that is, "High", "Middle" and "Low" are values of the hydraulic pressure of the devices. These values are previously stored in ECU 40.

The turning behavior control device of a vehicle of the embodiment of the present invention is composed as described above. Therefore, it exhibits the following action and effect. Contents of the action and effect will be explained referring to the flow charts shown in FIGS. 5 to 7.

Figure 5:
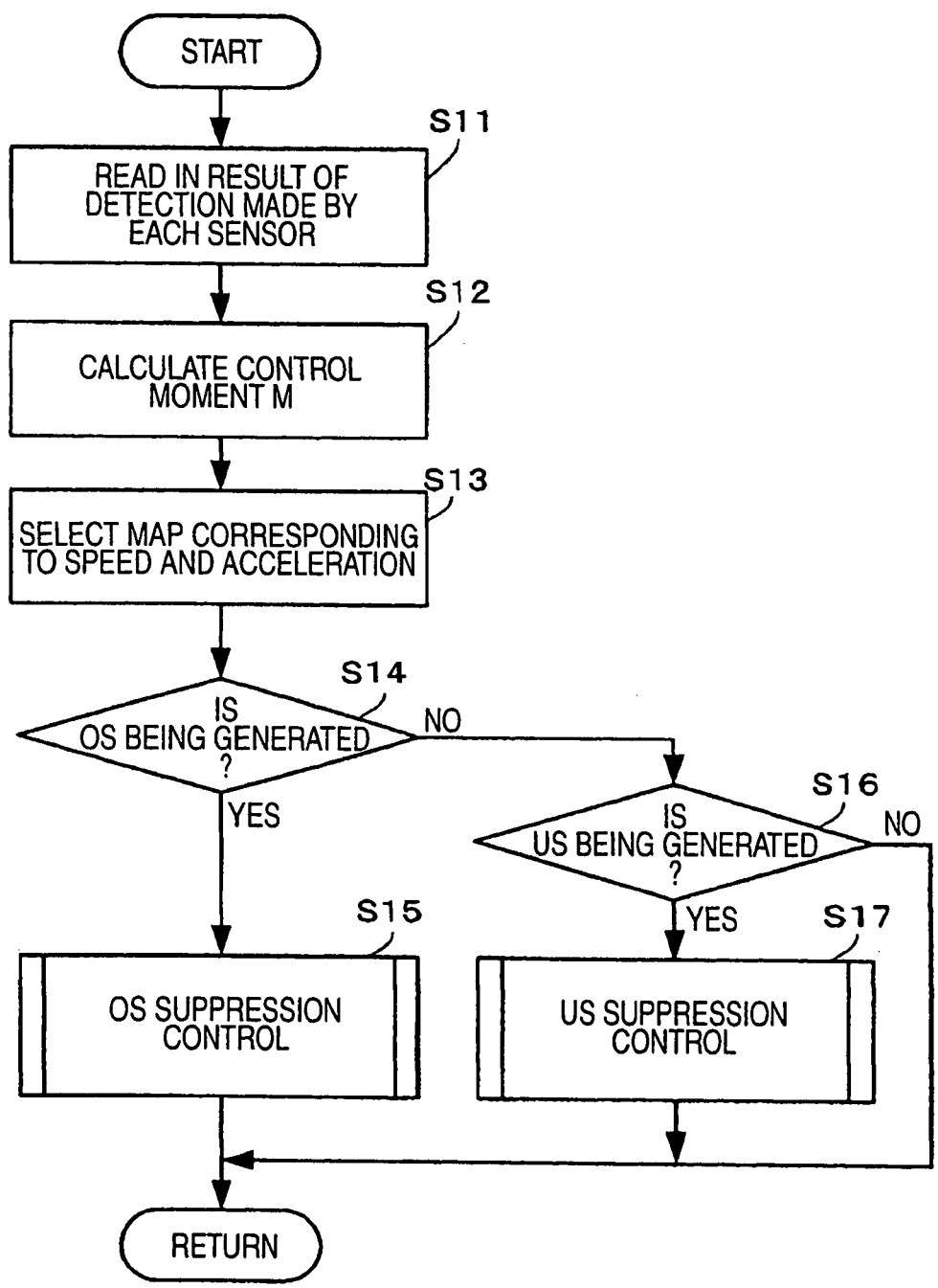
FIG. 5 is a flow chart showing control of a turning behavior control device of a vehicle of the first embodiment.
Figure 6:
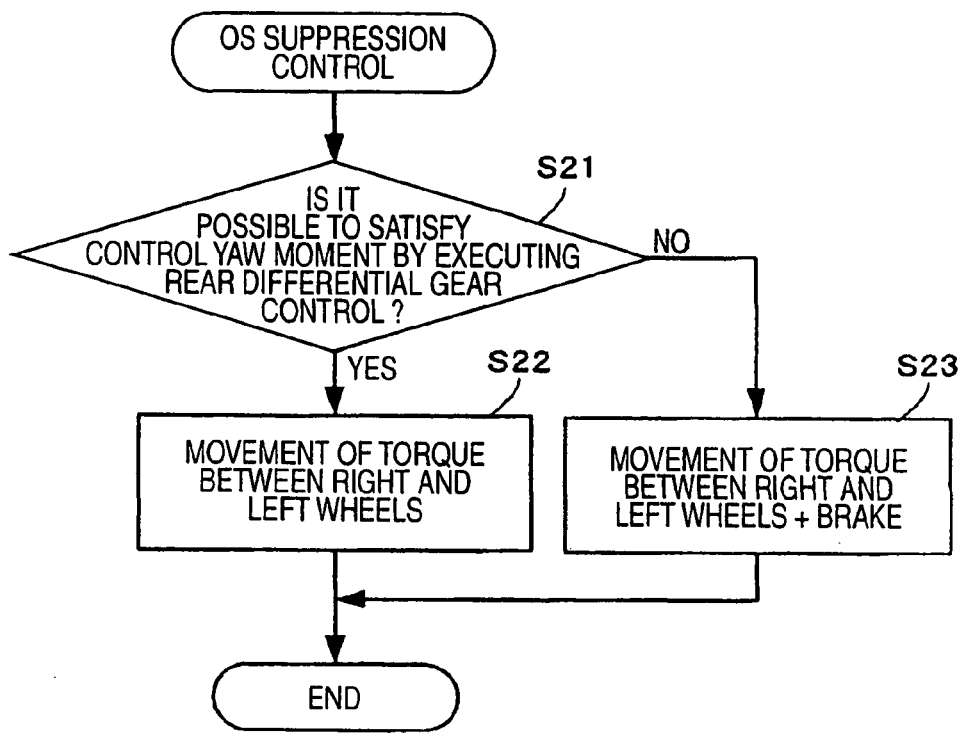
FIG. 6 is a flow chart showing control of a turning behavior control device of a vehicle of the first embodiment and also showing a sub-routine of OS suppression control.

As shown in FIG. 5, in step S11, the control yaw moment calculating portion 41 reads in a steering angle detected by the steering sensor 47, a vehicle speed detected by each vehicle speed sensor 45 and an actual yaw rate detected by the yaw rate sensor 49. At the same time, US/OS judging portion 42 reads in a lateral acceleration detected by G sensor 48.

In step S12, the control yaw moment calculating portion 41 calculates a target yaw rate according to the steering angle and the vehicle speed that was read in before. When the target yaw rate and the actual yaw rate are compared with each other, the control yaw moment calculating portion 41 calculates a control yaw moment. After that, in step S13, a map (shown in FIGS. 4A to 4E) corresponding to the speed and the acceleration and deceleration is selected.

In steps S14 and S16, according to the control yaw moment and the lateral acceleration, US/OS judging portion 42 judges whether over-steering (OS) is generated in the vehicle 1, under-steering (US) is generated in the vehicle 1 or neither under-steering (US) nor over-steering (OS) is substantially generated. In the case where US/OS judging portion 42 judges that the vehicle 1 is in a state in which over-steering has been generated, the program proceeds to step S15 and OS suppression control, which is a sub-routine, is carried out. When US/OS judging portion 42 judges in step 16 that under-steering is generated, the program proceeds to step S17 and US suppression control, which is a sub-routine, is carried out. In the case where US/OS judging portion 42 judges that neither under-steering nor over-steering is generated, the program returns as it is.

Next, OS suppression control and US suppression control, which are sub-routines, will be explained below. In OS suppression control shown in FIG. 6, when torque moving control (rear differential gear control) made between the right rear wheel 14R and the left rear wheel 14L by the rear differential gear controller 31 is carried out by the rear differential gear controller 31 in step S21, it is judged whether or not the control yaw moment can be satisfied.

In this case, when it is judged that the control yaw moment can be satisfied by carrying out the rear differential gear control, in step S22, the rear differential control is carried out according to the characteristic of the selected map. Due to the foregoing, a difference in torque between the right rear wheel 14R and the left rear wheel 14L is adjusted, so that over-steering generated in the vehicle 1 can be suppressed.

On the other hand, in the case where it is judged that the control yaw moment can not be satisfied even if the rear differential gear control is executed, in step S23, in addition to the rear differential gear control corresponding to the characteristic of the selected map, the control (the brake control) executed by the braking device controller 33, in which the braking force given to the outer turning wheel is made to be stronger than the braking force given to the inner turning wheel, is carried out. Due to the foregoing, over-steering generated in the wheel 1 is suppressed.

Figure 7:
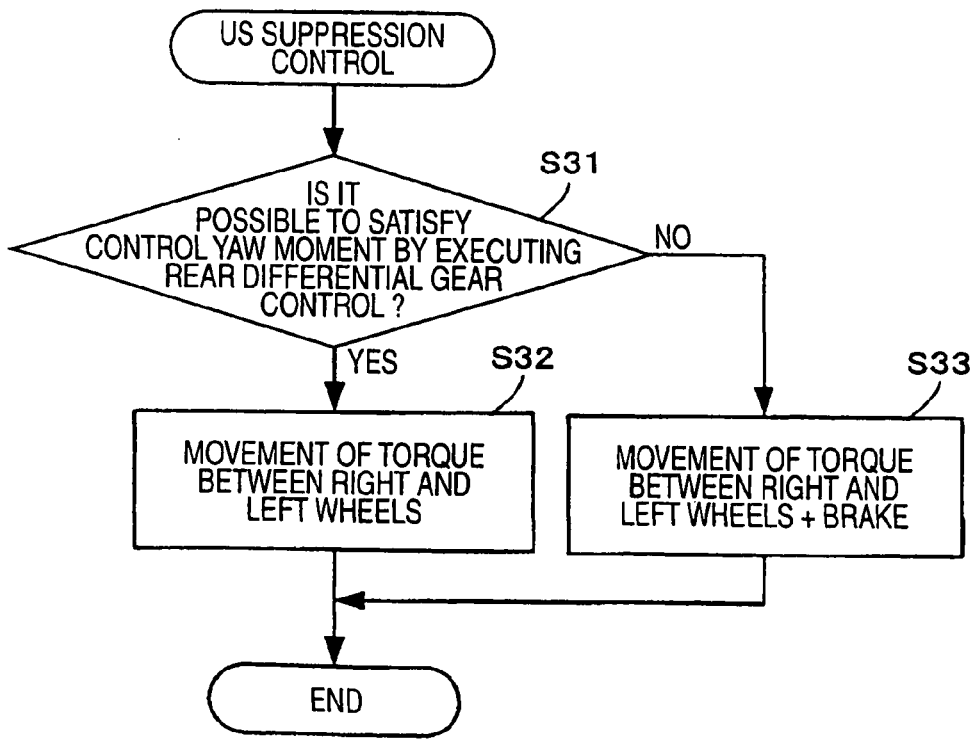
FIG. 7 is a flow chart showing control of a turning behavior control device of a vehicle of the first embodiment of the present invention and this flow chart shows a sub-routine of US suppression control.
Figure 8:
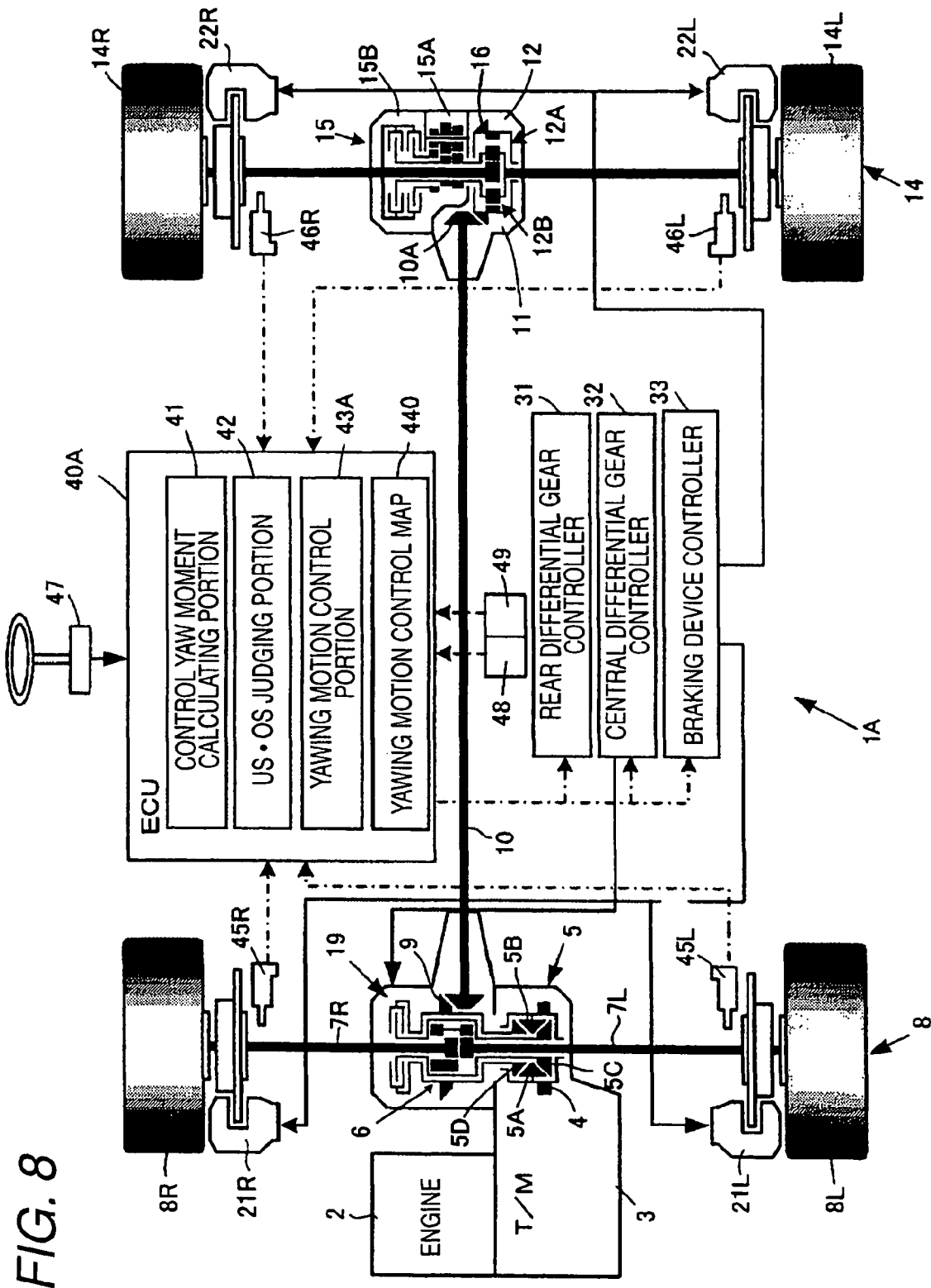
FIG. 8 is a schematic block diagram showing an overall arrangement of a turning behavior control device having a central differential gear of a second embodiment of the present invention.

US suppressing control shown in FIG. 7 will be explained as follows. In step S31, when the rear differential gear control is carried out, it is judged whether or not the control yaw moment can be satisfied. In this case, when it has been judged that the control yaw moment can be satisfied by carrying out the rear differential gear control, in step S32, the rear differential gear control is carried out corresponding to the characteristic of the selected map, so that a difference of torque between the right rear wheel 14R and the left rear wheel 14L can be adjusted. In this way, under-steering generated in the vehicle 1 is suppressed.

In the case where it has been judged that the control moment can not be satisfied only when the rear differential gear control is carried out, in step S33, in addition to the rear differential gear control, the braking control is carried out corresponding to the characteristic of the selected map, so that under-steering generated in the vehicle 1 can be suppressed.

As described above, in the present embodiment, in the case of suppressing the yawing motion of the vehicle 1, a drive force of the inner turning wheel is increased and a braking force of the outer turning wheel is increased. In the case of facilitating the yawing motion of the vehicle, a drive force of the outer turning wheel is increased and a braking force of the inner turning wheel is increased. Accordingly, the turning performance of the vehicle can be enhanced. At the time of suppressing the yawing motion and at the time of facilitating the yawing motion, an amount of the distribution of the control between the rear differential gear controller 31 and the braking device controller 33 is controlled being changed. Therefore, as compared with a case in which the amount of the distribution of the control is fixed, it is possible for the case of the present embodiment can flexibly cope with a state of the vehicle. Accordingly, a drive feeling can be enhanced.

That is, in the case of facilitating the yawing motion of the vehicle (at the time of the generation of US), a ratio of the amount of the control distributed to the rear differential gear controller 31 is made to be higher than the ratio in the case of suppressing the yawing motion of the vehicle (at the time of the generation of OS). Therefore, a drive force of the outer turning wheel, the ground contact load of which is heavy, is increased so that the yawing motion control can be effectively executed. In the case of suppressing the yawing motion of the vehicle 1 (at the time of the generation of OS), a ratio of the amount of the control distributed to the braking unit controller 33 is made to be higher than the ratio in the case of facilitating the yawing motion of the vehicle 1 (at the time of the generation of US). Therefore, a drive force of the outer turning wheel, the ground contact load of which is heavy, is increased so that the yawing motion control can be effectively executed and the turning performance can be stabilized.

In the present embodiment, in the case where the map shown in FIG. 4B is selected in step S13 of FIG. 5, a ratio of the amount of the control distributed to the rear differential controller 31 is made to be higher than the ratio of the case of deceleration shown in FIG. 4C. Therefore, at the time of acceleration in which a ground contact load of the wheel is increased, the drive force is more increased so that the yawing motion control can be more effectively executed. Accordingly, while a feeling of deceleration at the time of acceleration is being decreased, the turning performance can be stabilized and the drive feeling can be more enhanced. At the time of deceleration of the vehicle 1 and in the case where the map shown in FIG. 4C is selected in step S13 shown in FIG. 5, a ratio of the amount of the control distributed to the controller 33 of the braking unit is made to be higher than the ratio in the case of acceleration shown in FIG. 4C. Therefore, even when the wheel load is reduced due to deceleration, a decrease in the lateral force of the wheel caused by an increase in the difference of the drive force between the right wheel and the left wheel can be suppressed. Accordingly, the turning performance at the time of deceleration can be stabilized.

In the present embodiment, when the vehicle is running at a low speed and the map shown in FIG. 4E is selected in step S13 shown in FIG. 5, a ratio of the amount of the control distributed to the rear differential controller 31 is made to be higher than the ratio of the case of a high speed shown in FIG. 4D. When the vehicle is running at a high speed and the map shown in FIG. 4D is selected in step S13 shown in FIG. 5, a ratio of the amount of the control distributed to the controller 33 of the braking unit is made to be higher than the ratio of the case of a low speed shown in FIG. 4E. Therefore, while a feeling of deceleration caused by in increase in an excessively strong braking force is being suppressed, under-steering and over-steering can be properly suppressed and the turning performance of the vehicle can be enhanced.

Next, referring to FIGS. 8 to 14, a second embodiment of the present invention will be explained as follows. With respect to the arrangement of the first embodiment, the vehicle 1A of the present embodiment shown in FIG. 8 includes: a central differential gear 5; a differential limiting mechanism 19 for limiting a differential between a front and a rear wheel; and a central differential gear controller 32 (a third adjuster) for adjusting a degree of the limitation of the differential between the front and the rear wheel by controlling the differential limiting mechanism 19 for limiting a differential motion between a front and a rear wheel. The above points are different from the points of the first embodiment in the constitution of hardware. Further, contents of the control made by ECU 40A, which is a controller mounted on the vehicle 1A, are different. Therefore, like reference marks are used to indicate like components in the first and the second embodiment and the detailed explanations are omitted here. Only different constitution and control are mainly explained here.

An output of the engine 2 mounted on the four-wheel-drive type vehicle 1 is transmitted to the central differential gear 5 through the transmission 3 and the intermediate gear mechanism 4.

To be in more detail, the central differential gear 5 is provided with the differential limiting mechanism 19 for limiting a differential motion between a front and a rear wheel. An output of this central differential gear 5 is transmitted to the right wheel 8R and the left wheel 8L through the front differential gear 6 and the axles 7R, 7L. At the same time, the output of this central differential gear 5 is transmitted to the right wheel 14R and the left wheel 14L of the rear wheels 14 through the front wheel side hypoid gear mechanism 9, the propeller shaft 10, the rear side hypoid gear mechanism 11, the rear differential gear 12 and the axles 13R, 13L.

The center differential gear 5 includes: differential pinions 5A, 5B; and side gears 5C, 5D meshed with the differential pinions 5A, 5B. Torque inputted from the differential pinions 5A, 5B is transmitted to the front wheel 8 through one side gear 5C and at the same time transmitted to the rear wheel 14 through the other side gear 5D, the propeller shaft 10 and others. Since a differential motion between the front wheel 8 and the rear wheel 14 is allowed by the center differential gear 5 at this time, the turning property of the vehicle 1 is not obstructed.

This center differential gear 5 includes the mechanism 19 for limiting a differential motion between the front and the rear wheel capable of variably distributing torque, which has been outputted from the engine 2, to the front wheel 8 and the rear wheel 14 while a differential motion allowed between the front wheel 8 and the rear wheel 14 is being variably limited.

The mechanism 19 for limiting a differential motion between the front and the rear wheel includes a wet type hydraulic multiple disk clutch mechanism. Therefore, according to the hydraulic pressure inputted from a drive system hydraulic unit (not shown), the mechanism 19 for limiting a differential motion between the front and the rear wheel can adjust a degree of the limitation of the differential motion between the front wheel 8 and the rear wheel 14. Accordingly, a distribution of torque (drive force) transmitted to the front wheel 8 and the rear wheel 14 can be appropriately changed by this mechanism. In this connection, hydraulic pressure, which has been inputted from the drive system hydraulic unit into the mechanism 19 for limiting a differential motion between the front and the rear wheel, is controller by the center differential controller 32. This point will be described later.

Therefore, according to the mechanism 19 for limiting a differential motion between the front and the rear wheel, when a degree of the limitation of a differential motion is adjusted, the traction performance of the vehicle 1 can be enhanced. On the other hand, when a differential motion between the front wheel 8 and the rear wheel 14 is allowed, the turning property of the vehicle 1 can be enhanced.

The center differential controller 32 (the third adjuster) is an electronic control unit including an interface, memory and CPU not shown in the drawing. This center differential controller 32 is operated as follows. A signal indicating hydraulic pressure corresponding to a degree of the limitation of a differential motion between the front wheel 8 and the rear wheel 14 and a signal indicating the output destination of the hydraulic pressure (a signal of the limitation of a differential motion between the front and the rear wheel) are sent to the drive system hydraulic unit. When the drive system hydraulic unit, which has received this signal of the limitation of a differential motion between the front and the rear wheel, properly controls hydraulic pressure for the mechanism 19 for limiting a differential motion between the front and the rear wheel of the central differential gear 5, a degree of the limitation of a differential motion between the front wheel 8 and the rear wheel 14 is adjusted.

ECU 40A is an electronic control unit including an interface, memory and CPU not shown in the drawing. This ECU 40A can read in the result of the measurement made by the wheel speed sensor (the second detector) 45L, 45R, 46L, 46R, the steering angle sensor 47, G sensor (the first detector) 48 and the yaw rate sensor 49.

This ECU 40A has a program recorded in a memory not shown in the drawing and this program includes a control yaw moment calculating portion 41, an under-steering/over-steering judging portion (US/OS judging portion) 42 and a yawing motion control portion (the motion controller) 43A. In this memory, the yawing motion control map 440 used by the yawing motion control portion 43A is recorded. In this connection, functions of the control yaw moment calculating portion 41 and US/OS judging portion 42 are the same as those of the first embodiment. Therefore, the explanations are omitted here.

The yawing motion control portion 43A controls a rear differential controller 31, a central differential controller 32 and a braking unit controller 33 according to a turning state of the vehicle 1, so that a yaw moment corresponding to the control yaw moment can be generated in the vehicle 1A.

According to the yaw control yaw moment obtained by the control yaw moment calculating portion 41, the result of the judgment made by US/OS judging portion 42 (the turning state of the vehicle 1) and the acceleration (the acceleration in the longitudinal direction) of the vehicle 1 measured by G sensor 48, these values are applied to the yawing motion control map 440. In this way, the yawing motion control portion 43A obtains control values with respect to the rear differential controller 31, the central differential controller 32 and the braking unit controller 33.

The control value for the rear differential controller 31 is a hydraulic value of the mechanism 15 for moving a drive force between the right and the left wheel. The control value for the brake unit controller 33 is a hydraulic pressure increase and decrease value of each braking unit 21L, 21R, 22L, 22R. The control value for the central differential controller 32 is a value expressing a degree of the differential regulation between the front and the rear wheel executed by the differential limiting mechanism 19 for limiting a differential between the front and the rear wheel of the central differential gear 5. More particularly, the control value for the central differential controller 32 is a hydraulic value of the differential limiting mechanism 19 for limiting a differential between the front and the rear wheel.

Next, the yawing moment control map 440 will be explained below. In the present embodiment, as shown in FIGS. 11A to 11E, the yawing moment control map 440 is formed out of a plurality of maps. The map shown in FIG. 11A is a basic one. FIG. 11B is a map selected at the time of acceleration of the vehicle. FIG. 11C is a map selected at the time of deceleration of the vehicle. FIG. 11D is a map selected at the time of running of the vehicle at a high speed. FIG. 11E is a map selected at the time of running of the vehicle at a low speed. By using the map shown in FIG. 11A which represents all maps, a basic structure of the map will be explained as follows. The axis of abscissas of the yawing motion control map 440 prescribes a turning state of the vehicle 1, that is, a degree of under-steering (US) or a degree of over-steering (OS) generated in the vehicle 1, which is found from the control yaw moment obtained by the control yaw moment calculating portion 41 and found from the result of the judgment made by US/OS judging portion 42, is prescribed. On the other hand, the axis of ordinate prescribes absolute values of the controls values for the rear differential gear controller 31, the central differential gear controller 32 and the braking unit controller 33.

As shown in FIG. 9, the over-steering suppression region 440A and the under-steering suppression region 440B are mainly prescribed in the yawing motion control map 440. In this over-steering suppression region 440A, the rear differential gear control region 440A1, the central differential gear control region 440A2 and the braking control region 440A3 are prescribed in the order of the control yaw moment, wherein the lowest control yaw moment is arranged first. The rear differential gear control region 440B1 and the brake control region 440B2 are prescribed in the under-steering suppression region 440B in the order of the control yaw moment in which the lowest control yaw moment is arranged at the first.

In the case of suppressing the yawing motion of the vehicle 1, that is, in the case of suppressing over-steering generated in the vehicle 1, the yawing motion control portion 43A is operated as follows. First, the rear differential controller 31 is controlled so that a drive force of the wheel in the right wheel 14R and the left wheel 14L, which is located on the turning center side, that is, a drive force of the inner turning wheel can be increased. Next, the center differential gear controller 32 is controlled so that a restriction of the differential motion between the front wheel 8 and the rear wheel 14 can be strengthened. In the case where over-steering generated in the vehicle 1A is suppressed and only in the case where the control yaw moment can not be generated even when the control of a drive force between the right and the left wheel is carried out by the rear differential gear controller 31 and even when the control of the limitation of the differential motion between the front and the rear wheel is carried out by the central differential gear controller 32, the yawing motion control portion 43A controls the braking unit controller 33 so that a braking force of the outer turning wheel can become stronger than a braking force of the inner turning wheel.

That is, the yawing motion control portion 43A is provided with the yawing motion control map 440 for controlling the yawing motion of the vehicle 1A by controlling at least one the yawing motion adjuster out of the rear differential gear controller 31, the central differential gear controller 32 and the braking unit controller 33. The yawing motion control portion 43A is capable of changing a distribution of the amount of control of the rear differential gear controller 31, the central differential gear controller 32 and the braking unit controller 33. The characteristic of the distribution of the amount of control is previously set by the yawing motion control map 440 shown in FIGS. 11A to 11E.

In the case where the result of the detection made by G sensor 48 is a deceleration (shown in FIG. 11C), the yaw motion control portion 43A of the present embodiment makes an amount of the distribution of control, which is executed by the center differential controller 32, to be smaller than an amount of the distribution of control executed by the central differential gear controller 32 in the case of acceleration shown in FIG. 11B. In the case where the yawing motion of the vehicle 1A is suppressed (at the time of the generation of OS) and in the case where a target yawing momentum correlative value cannot be satisfied even when the rear differential controller 31 and the central differential controller 32 are controlled, the yaw motion control portion 43A of the present embodiment controls the braking unit controller 33 so that a braking force of the outer turning wheel can be increased. This point is different from the yawing portion control portion 43 of the first embodiment.

Absolute values of control corresponding to the acceleration, deceleration and speed of the vehicle and amounts of the control distribution between the mechanism 15 of moving a drive force between the right and the left wheel and the braking unit are the same as those of the first embodiment.

In the case where the result of the detection made by G sensor 48 is an acceleration (shown in FIG. 11B), the yawing motion control map 440 makes a ratio of the amount of control distributed to the rear differential controller 31 to be higher than that of the case of a deceleration (shown in FIG. 11C). In the case where the result of the detection made by G sensor 48 is a deceleration (shown in FIG. 11C), the yawing motion control map 440 makes a ratio of the amount of control distributed to the braking unit controller 33 to be higher than that of the case of an acceleration (shown in FIG. 11B). In the case where the result of the detection of each wheel speed sensor is a low speed (shown in FIG. 11E), a ratio of the amount of control distributed to the rear differential controller 31 is made to be higher than that of the case of a high speed (shown in FIG. 11D). In the case where the result of the detection of each wheel speed sensor is a high speed 9 shown in FIG. 11E), a ratio of the amount of control distributed to the braking unit controller 33 is made to be higher than that of the case of a low speed (shown in FIG. 11E). The characteristics are set as described above.

The characteristic of strength and weakness of an amount of control is shown in FIG. 10. In FIG. 10, "rear dif" is a rear differential gear controller 31 (a drive force moving mechanism 15 for moving a drive force between the right and the left wheel), "center dif" is a central differential gear controller 32 (a differential limiting mechanism 19 for limiting a differential between the front and the rear wheel, and "brake" is a braking unit controller 33 (braking unit 21L, 21R, 22L, 22R). In FIG. 10, "high", "middle" and "low" respectively show an absolute value of each device, that is, "high", "middle" and "low" respectively show a relation between the hydraulic values of the devices. Values of these "high", "middle" and "low" are previously stored in ECU 40A.

Since the turning behavior control device of a vehicle of the second embodiment of the present invention is composed as described above, the following action and effect can be provided. The contents will be explained referring to the flow chart shown in FIGS. 12 to 14.

Figure 12:
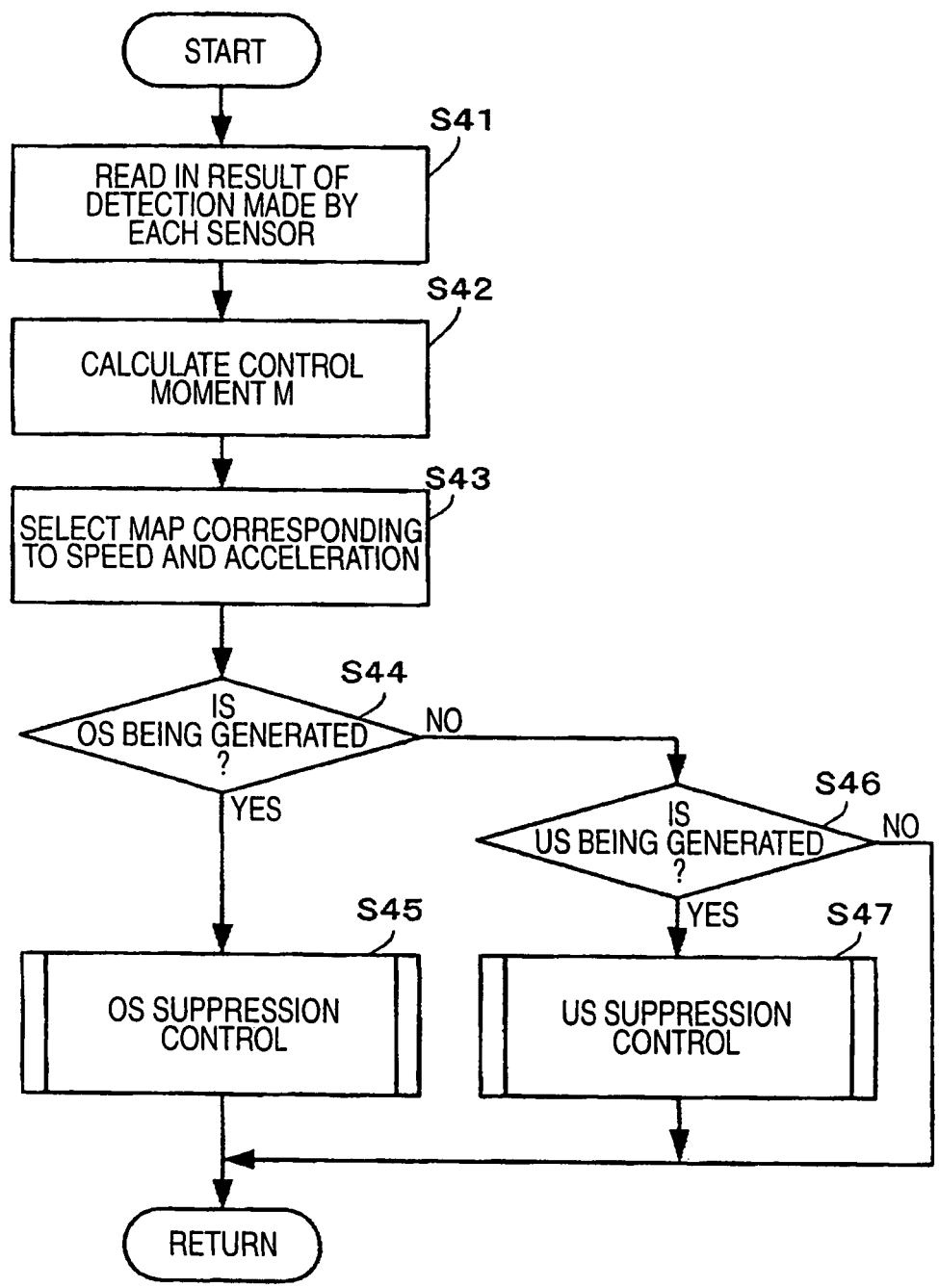
FIG. 12 is a flow chart showing control of a turning behavior control device of a vehicle of the second embodiment.
Figure 13:
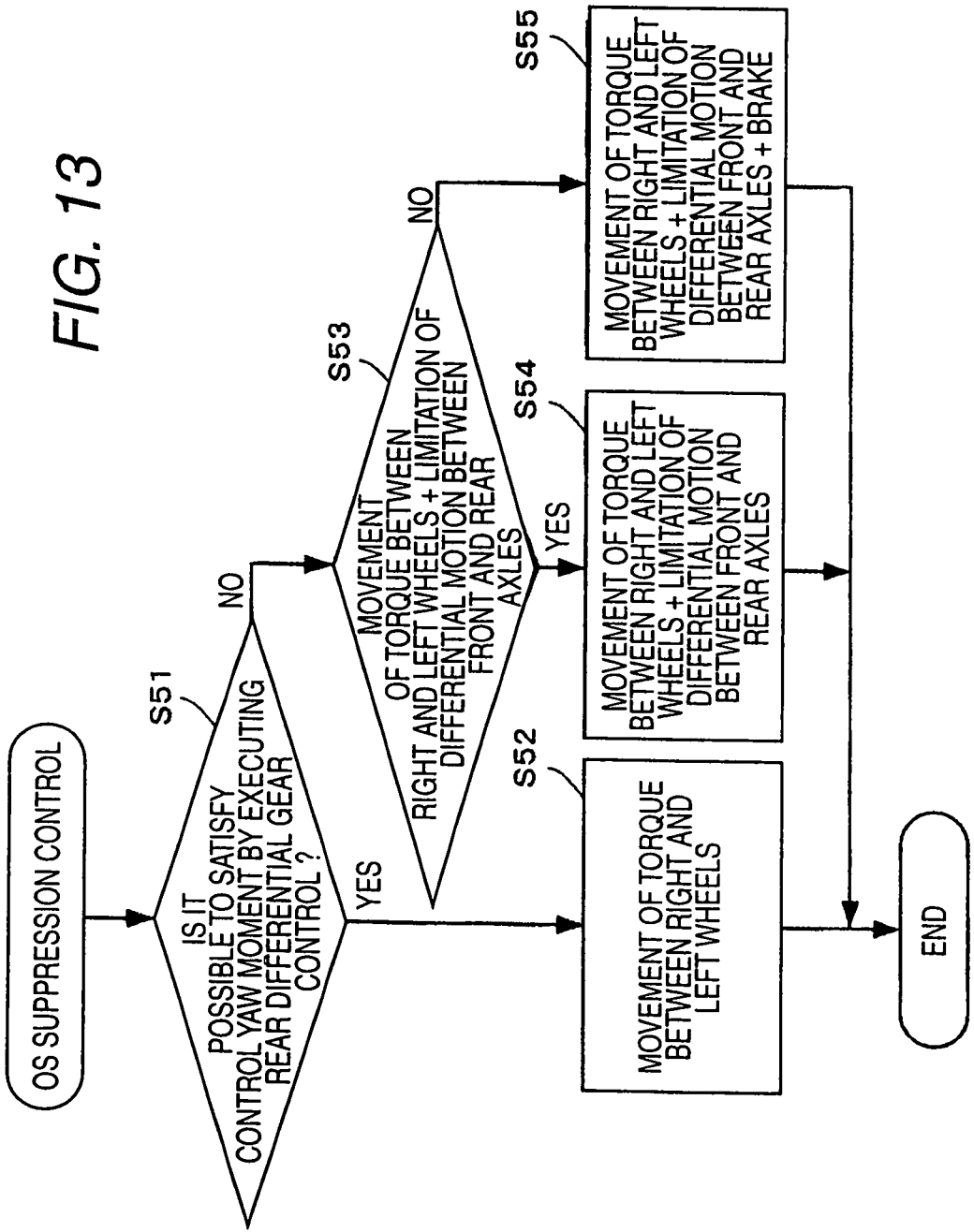
FIG. 13 is a flow chart showing control of a turning behavior control device of a vehicle of the second embodiment and this flow chart shows a sub-routine of OS suppression control.

As shown in FIG. 12, in step S41, the control yaw moment calculating portion 41 reads in a steering angle detected by the steering angle sensor, a vehicle speed detected by each vehicle speed sensor 45 and an actual yaw rate detected by the yaw rate sensor 49. At the same time, US/SO judging portion 42 reads in a lateral acceleration detected by G sensor 48.

In step S42, the control yaw moment calculating portion 41 calculates a target yaw rate according to the steering angle and the vehicle speed which have been read in. The control yaw moment calculating portion 41 calculates a control yaw moment by comparing this target yaw rate with the actual yaw rate.

After that, in step S43, a map (FIGS. 11A to 11E) corresponding to the speed, acceleration and deceleration is selected. In steps S44 and S46, according to the control yaw moment and the lateral acceleration, US/OS judging portion 42 judges whether over-steering (OS) is generated in the vehicle 1, under-steering (US) is generated in the vehicle 1 or neither under-steering (US) nor over-steering (OS) is substantially generated in the vehicle 1.

In the case where US/OS judging portion 42 judges that the vehicle 1A is in a state in which over-steering is generated, the program proceeds to step S45 and OS suppression control, which is a sub-routine, is carried out. On the other hand, in the case where US/OS judging portion 42 judges in step S46 that the vehicle 1A is in a state in which under-steering is generated, the program proceeds to step S47 and US suppression control, which is a sub-routine, is carried out. In the case where US/OS judging portion judges that neither under-steering nor over-steering is substantially generated in the vehicle, the program is returned as it is.

Next, OS suppression control and US suppression control will be explained below. OS suppression control shown in FIG. 13 judges whether or not the control yaw moment can be satisfied by carrying out the torque moving control (the rear differential gear control) between the right rear wheel 14R and the left rear wheel 14L by the rear differential controller 31 in step S51.

In the case where it is judged that the control yaw moment can be satisfied by carrying out the rear differential gear control, the rear differential gear control is carried out in step S52, so that a difference in torque between the right rear wheel 14R and the right left wheel 14L can be adjusted. In this way, over-steering generated in the vehicle 1A is suppressed.

On the other hand, in the case where it is judged that the control yaw moment can not be satisfied even when the rear differential gear control is carried out, in step S53, the rear differential gear control and the control (the central differential gear control) of controlling a degree of the limitation of a differential motion between the front wheel 8 and the rear wheel 14 executed by the center differential controller 32 are carried out. Due to the foregoing, it is judged whether or not the control yaw moment can be satisfied.

In the case where it is judged that the control yaw moment can be satisfied by carrying out the rear differential gear control and the central differential gear control, in step S54, the rear differential gear control and the central differential gear control are carried out. Due to the foregoing, a difference in torque between the right rear wheel 14R and the left rear wheel 14L and a limitation of a differential motion between the front wheel and the rear wheel 14 are adjusted so that over-steering generated in the vehicle 1A can be suppressed.

On the other hand, in the case where it is judged that the control moment can not be satisfied even when the rear differential gear control and the central differential gear control are carried out, in step S55, in addition to the rear differential gear control and the central differential gear control, the control (the braking control) executed by the braking unit controller 33, in which a braking force given to the outer turning wheel is made to be stronger than a braking force given to the inner turning wheel, is carried out, so that over-steering generated in the vehicle 1A can be suppressed.

Figure 14:
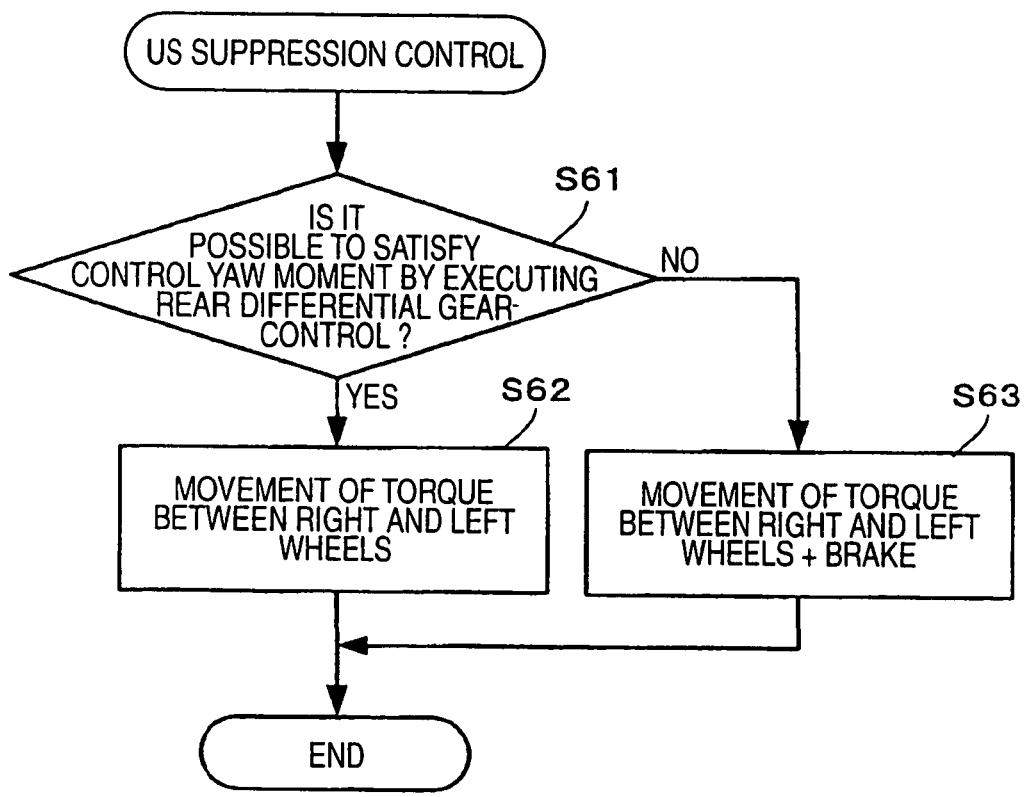
FIG. 14 is a flow chart showing control of a turning behavior control device of a vehicle of the first embodiment of the present invention where this flow chart shows a sub-routine of US suppression control.

US suppression control shown in FIG. 14 will be explained below. In step S61, it is judged whether or not the control yaw moment can be satisfied by carrying out the rear differential control. In the case where it is judged that the control yaw moment can be satisfied by carrying out the rear differential gear control, in step S62, the rear differential gear control is carried out, so that a difference in torque between the right rear wheel 14R and the left rear wheel 14L can be adjusted and under-steering generated in the vehicle 1A can be suppressed.

On the other hand, in the case where it is judged that the control moment can not be satisfied only when the rear differential gear control is carried out, in step S63, in addition to the rear differential control, the braking control is carried out, so that under-steering generated in the vehicle 1 can be suppressed.

As described above, in the present embodiment, an amount of the distribution of control made by the central differential controller 32 at the time of deceleration of the vehicle is set to be smaller than that at the time of acceleration of the vehicle. Due to the foregoing, a limitation of the differential motion at the time of suppression of the yawing motion in the process of deceleration is small and braking of the rear wheels 14R, 14L can be reduced. Therefore, over-steering can be effectively suppressed. Especially at the time of deceleration, the turning performance of the vehicle can be stabilized.

In the case where the yawing motion of the vehicle 1A can not be sufficiently suppressed even by the rear differential gear controller 31 and the center differential controller 32, a braking force given to the outer turning wheel is increased by the braking unit controller 33. Therefore, while a deterioration of the acceleration performance is being suppressed, the turning performance of the vehicle 1A can be enhanced and the drive feeling can be enhanced.

In the present embodiment, in the same manner as that of the first embodiment, in the case of suppressing a yawing motion of the vehicle 1A, a drive force given to the inner turning wheel is increased and a braking force given to the outer turning force is increased. In the case of facilitating a yawing motion of the vehicle 1A, a drive force given to the outer turning wheel is increased and a braking force given to the inner turning force is increased. Therefore, the turning performance of the vehicle can be enhanced. Further, amounts of the distribution of control distributed to the rear differential controller 31 and the braking unit controller 33 are variably controlled. Therefore, as compared with the constitution in which amounts of the distribution of control are fixed, the constitution of the present embodiment can flexibly cope with a state of the vehicle and the drive feeling can be enhanced.

That is, in the case of facilitating a yawing motion of the vehicle (at the time of the generation of US), a ratio of the amount of control distributed to the rear differential controller 31 is made to be higher than a ratio of the amount of control in the case of suppressing a yawing motion of the vehicle 1 (at the time of the generation of OS) In this way, a drive force of the outer turning wheel, the ground contact load of which is heavy, is increased, so that the yawing motion control can be effectively executed. In the case of suppressing a yawing motion of the vehicle (at the time of the generation of OS), a ratio of the amount of control distributed to the braking unit controller 33 is made to be higher than a ratio of the amount of control in the case of facilitating a yawing motion of the vehicle 1 (at the time of the generation of US). In this way, a braking force given to the outer turning wheel, the ground contact load of which is heavy, is increased and the yawing motion control is effectively executed and the turning performance can be stabilized.

In the case where the vehicle 1A is accelerated and the map shown in FIG. 11B is selected in step S43 shown in FIG. 12, a ratio of the amount of control distributed to the rear differential controller 31 is made to be higher than a ratio of the amount of control in the case of deceleration shown in FIG. 11C. Therefore, at the time of acceleration at which a ground contact load of the wheel is increased, a drive force can be enhanced and the yawing motion control can be effectively executed. Accordingly, while a feeling of deceleration at the time of acceleration is being reduced, the turning performance can be stabilized and the drive feeling can be enhanced. In the case where the vehicle 1A is decelerated and the map shown in FIG. 11C is selected in step S43 shown in FIG. 12, a ratio of the amount of control distributed to the braking unit controller 33 is made to be higher than a ratio of the amount of control in the case of acceleration shown in FIG. 11B. Therefore, even when a load given to the wheel is decreased at the time of deceleration, a reduction of the lateral force given to the wheel, which is caused by a difference in the drive force between the right and the left wheel, can be suppressed. Accordingly, the turning performance at the time of deceleration can be stabilized.

In the present embodiment, in the case where the vehicle 1A is running at a low speed and the map shown in FIG. 11E is selected in step S43 shown in FIG. 12, a ratio of the amount of control distributed to the rear differential controller 31 is made to be higher than a ratio of the amount of control in the case where the vehicle is running at a high speed shown in FIG. 11D. In the case where the vehicle 1A is running at a high speed and the map shown in FIG. 11D is selected in step S43 shown in FIG. 12, a ratio of the amount of control distributed to the braking unit controller 33 is made to be higher than a ratio of the amount of control in the case where the vehicle is running at a low speed shown in FIG. 11E. Accordingly, while a feeling of deceleration, which is caused by an excessive increase in the braking force, is being suppressed, under-steering and over-steering can be properly suppressed and the turning performance of the vehicle can be enhanced.

The embodiment of the present invention has been explained above. However, it should be noted that the present invention is not limited to the above specific embodiment. Variations can be made without departing from the spirit and the scope of the present invention.

In the above embodiment, the front differential gear 6 is a torque induction type differential gear which mechanically restricts a differential motion made between the right 8R and the left wheel 8L according to an intensity of torque inputted from the engine 2. However, it should be noted that the present invention is not limited to the above specific embodiment. For example, the drive force moving mechanism 15 for moving a drive force between the right and the left wheel may be arranged not only in the rear differential gear 12 but also in the front differential gear 6. Alternatively, the drive force moving mechanism 15 for moving a drive force between the right and the left wheel may be arranged only in the front differential gear 6.

In the above embodiment, explanations are made into the case in which the vehicle 1 is a four-wheel drive vehicle. However, the vehicle 1 is not especially limited to a four-wheel-drive vehicle. The vehicle 1 may be a front-wheel drive vehicle. Alternatively, the vehicle 1 may be a rear-wheel drive vehicle.

In the above embodiment, explanations are made into the case in which when the rear differential controller 31 controls the drive force moving mechanism 15 for moving a drive force between the right and the left wheel, a difference between the torque transmitted from the engine 1 to the right rear wheel 14R and the torque transmitted from the engine 1 to the left rear wheel 14L is adjusted. However, it should be noted that the present invention is not limited to the above specific embodiment. For example, drive forces of electric motors, which are respectively arranged on the front wheel side or the rear wheel side, may be independently adjusted. In this connection, in this case, other than an electric motor, another drive source such as an engine may be mounted on the vehicle.

Instead of the drive force moving mechanism 15 for moving a drive force between the right and the left wheel, a mechanism of distributing a drive force between the right and the left wheel may be used. For example, the following constitution may be adopted. When clutch mechanisms are respectively arranged in the right and the left wheel and fastening forces of these clutch mechanisms are adjusted, intensities of the drive forces transmitted to the right and the left wheel may be changed. Further, this constitution may be applied to the rear wheel side or the front wheel side.

In the above embodiment, a judgment of under-steering/over-steering is made according to the control yaw moment obtained by the control yaw moment calculating portion 41 and according to the acceleration in the lateral direction of the vehicle 1 measured by G sensor 48. However, it should be noted that the present invention is not limited to the above specific embodiment. As long as it is possible to judge a turning state of the vehicle, any structure may be adopted.

In the above embodiment, the speed information is detected by the vehicle speed sensors 45L, 45R, 46L, 46R. However, it should be noted that the present invention is not limited to the above specific embodiment. For example, the following constitution may be adopted. Low-speed-corner/high-speed-corner is estimated from the detection information sent from the steering wheel angle sensor 47 and a map is selected according to the thus estimated value.

In the above embodiment, an acceleration of the vehicle in the longitudinal direction is detected by G sensor 48. However, the present invention is not limited to the above specific embodiment. For example, when a vehicle speed is differentiated, a longitudinal acceleration is estimated and a map may be selected from this estimated value. Alternatively, when a longitudinal acceleration is estimated from an output torque of the engine 2, a total reduction ratio of the transmission 3 and a braking torque of the breaking unit 21L, 21R, 22L, 22R, a map may be selected according to the estimated value.

In the above embodiment, the differential limiting mechanism 19 for limiting a differential between a front and a rear wheel is of the gear type. However, the present invention is not limited to the above specific embodiment. As long as it has the same function, any type differential limiting mechanism may be used.

What is claimed is:

1. A turning behavior control device of a vehicle having front and rear, right and left wheels, the turning behavior control device comprising:
    a control yaw moment calculator, calculating control yaw moment to be added to the vehicle;
    a first yaw motion adjustor, adjusting drive force applied to the right and the left wheels in at least one of the front wheels and the rear wheels to adjust a difference in driving force between the right and left wheels;
    a second yaw motion adjustor, adjusting a braking force of a braking device applied to the right and left wheels in at least one of the front wheels and the rear wheels to adjust a difference in braking force between the right and left wheels;
    a yaw motion controller, outputting control signals to the first and second yaw motion adjustors to generate the control yaw moment, and controlling the second yaw motion adjustor such that braking force of the turning outer wheel increases while controlling the first yaw motion adjustor such that driving force of the turning inner wheel increases when restraining the yaw motion of the vehicle, and controlling the second yaw motion adjustor such that braking force of the turning inner wheel increases while controlling the first yaw motion adjustor such that driving force of the turning outer wheel increases when accelerating the yaw motion of the vehicle; and
    an acceleration and deceleration detector, detecting an acceleration and deceleration of the vehicle, wherein:
    when the acceleration and deceleration detector detects acceleration of the vehicle, the yaw motion controller increases a rate of an amount of control distributed to the first yaw motion adjustor as to be larger than a rate of an amount of control distributed to the first yaw motion adjustor when the acceleration and deceleration detector detects deceleration of the vehicle; and
    when the acceleration and deceleration detector detects deceleration of the vehicle, the yaw motion controller increases a rate of an amount of control distributed to the second yaw motion adjustor as to be larger than a rate of an amount of control distributed to the second yaw motion adjustor when the acceleration and deceleration detector detects acceleration of the vehicle, and
    wherein, the yaw motion controller varies a rate of the amount of control distributed to the second yaw motion adjustor with respect to the amount of control distributed to the first yaw motion adjustor while simultaneously increasing the amount of control distributed to the first yaw motion adjustor and the amount of control distributed to the second yaw motion adjustor as a degree of oversteer or a degree of understeer increases.

2. The turning behavior control device according to claim 1, further comprising:
    a vehicle speed detector, detecting a speed of the vehicle, wherein:
    when the detected speed is low, the yaw motion controller increases a rate of an amount of control distributed to the first yaw motion adjustor as to be larger than a rate of an amount of control distributed to the first yaw motion adjustor when the detected speed is high; and
    when the detected speed is high, the yaw motion controller increases a rate of an amount of control distributed to the second yaw motion adjustor as to be larger than a rate of an amount of control distributed to the second yaw motion adjustor when the detected speed is low.

3. The turning behavior control device according to claim 1, further comprising:
    a third yaw motion adjustor, adjusting a degree of limitation of the differential between the front wheels and the rear wheels, wherein:
    the yaw motion controller controls at least two of the first yaw motion adjustor, the second yaw motion adjustor, and the third yaw motion adjustor to control the yaw motion of the vehicle; and
    the yaw motion controller decreases the rate of an amount of control distributed to the third yaw motion adjustor when the acceleration and deceleration detector detects deceleration of the vehicle, as to be smaller than a rate of an amount of control distributed to the third yaw motion adjustor when the acceleration and deceleration detector detects acceleration of the vehicle.

4. The turning behavior control device according to claim 3, further comprising:
    a target yaw rate calculator, calculating a target yaw rate of the vehicle, wherein
    the yaw motion controller controls the second yaw motion adjustor such that the braking force of the turning outer wheel increases when restraining the yaw motion of the vehicle and when an actual yaw rate after the first yaw motion adjustor and the third yaw motion adjustor have been controlled does not match the target yaw rate.

* * * * *